United States Patent
Kuroiwa et al.

(10) Patent No.: US 7,113,653 B2
(45) Date of Patent: Sep. 26, 2006

(54) REGISTRATION CORRECTION METHOD IN IMAGE PROCESSING, AND VEGETATION STATE DISPLAY METHOD USING THE REGISTRATION CORRECTION METHOD

(75) Inventors: Megumu Kuroiwa, Nagasaki (JP); Jong Hwan Kim, Nagasaki (JP); Norikazu Matsumoto, Nagasaki (JP); Jun Sakata, Tokyo (JP); Kazumoto Onodera, Tokyo (JP); Takakazu Ishimatsu, Nagasaki (JP); Byungdug Jun, Nagasaki (JP); Kazuichi Sugiyama, Nagasaki (JP); Eung Nam Kim, Inchon (KR)

(73) Assignee: Electric Power Development Co., Ltd., Tokyo (JP)

( * ) Notice: Subject to any disclaimer, the term of this patent is extended or adjusted under 35 U.S.C. 154(b) by 781 days.

(21) Appl. No.: 10/352,203

(22) Filed: Jan. 28, 2003

(65) Prior Publication Data
US 2003/0156186 A1    Aug. 21, 2003

(30) Foreign Application Priority Data
Jan. 31, 2002  (JP) ............................. 2002-024819

(51) Int. Cl.
*G06K 9/32* (2006.01)
(52) U.S. Cl. ..................................... 382/294
(58) Field of Classification Search ............... 382/294, 382/286, 287, 289, 291, 295, 296; 352/160; 358/1.9; 348/218.1
See application file for complete search history.

(56) References Cited

U.S. PATENT DOCUMENTS

| | | | |
|---|---|---|---|
| 6,134,022 A * | 10/2000 | Yamamoto et al. | 358/1.9 |
| 6,450,644 B1 * | 9/2002 | Goodhill et al. | 352/160 |
| 7,015,954 B1 * | 3/2006 | Foote et al. | 348/218.1 |
| 2001/0052992 A1 * | 12/2001 | Tatsumi | 358/1.9 |
| 2004/0163562 A1 * | 8/2004 | Lewis et al. | 101/485 |
| 2006/0002631 A1 * | 1/2006 | Fu et al. | 382/294 |

\* cited by examiner

*Primary Examiner*—Sanjiv Shah
(74) *Attorney, Agent, or Firm*—Oliff & Berridge, PLC (57) ABSTRACT

The present invention provides a registration correction method for image processing, by which location deviations among images with different behaviors such as visible ray images and invisible ray images can be corrected. According to this method, one of a visible ray image and an invisible ray image is designated as a reference image, and the other as an object image. A reference window is set within the reference image, and an object window of the same size as the reference window is set within the object image. While the object window is shifted by the pixel within the object image, the differential values of the brightness in the x-axis and y-axis directions of each pixel in the reference window and the object window are obtained. The object point where the total of the squares or the absolute values of the differences between the differential values of the reference window and the object window becomes smallest is set as the point corresponding to the reference point of the reference window. Thus, the visible ray image and the invisible ray image are matched with each other, with a plurality of points each determined in the above manner being the reference points for the matching.

2 Claims, 13 Drawing Sheets

Fig. 2

FILE MANAGER DIALOG BOX

Fig. 3

EXAMPLE OF READ-IN IMAGES

Fig. 4

IMAGE CONTROL DIALOG BOX
(DESIGNATING NATURAL COLOR COMPOSITION)

Fig. 5

COLOR COMPOSITIONS PRIOR TO POSITION CORRECTION

Fig. 6

RESULT OF AUTOMATIC POSITION MATCHING

Fig. 7

REFERENCE IMAGE AND OBJECT IMAGE

Fig. 8

TRUE COLOR COMPOSITION     NATURAL COLOR COMPOSITION     INFRARED COLOR COMPOSITION

COLOR COMPOSITIONS AFTER POSITION MATCHING

IMAGES OF A TREE WITH LEAVES HAVING FALLEN OFF

Fig. 12

CALCULATION OF A DEVIATION BY SSDA PERFORMED
ON ORIGINAL IMAGES

Fig. 13

IMAGES OF A DEVIATION BY SSDA PERFORMED ON DIFFERENTIAL IMAGES

Fig. 14

COLOR COMPOSITIONS ACCORDING TO THE RESULTS
OF THE SSDA PERFORMED ON DIFFERENTIAL IMAGES

REGISTRATION CORRECTION METHOD IN IMAGE PROCESSING, AND VEGETATION STATE DISPLAY METHOD USING THE REGISTRATION CORRECTION METHOD

BACKGROUND OF THE INVENTION

1. Field of the Invention

The present invention relates to a registration correction method that is applicable to image processing for matching visible ray images that are formed in visible ray band areas with invisible ray images that are formed in invisible ray band areas. The present invention also relates to a vegetation state display method for displaying a state of vegetation in a clear view, using the registration correction method applied to image processing.

2. Description of the Related Art

In recent years, images formed by CCD cameras have been widely analyzed in various technical fields, including evaluation of activity degrees of plants. Images taken at each band by a CCD camera has a deviation ranging from a few pixels to tens of pixels. If those images are simply placed on top of one another, the resultant image is blurred. Even if an analysis is conducted on the resultant image in such a state, preferable results cannot be expected.

To measure the deviations among the images and match the positions among the images, the following methods have been suggested and used.

1) Shifting a predetermined image among images overlapping one another, while visually checking the combined image.

2) Determining a point that is supposed to be common among monochrome images taken at each band, and placing the images on top of one another according to the deviations obtained from the determined point.

However, the above methods 1) and 2) have the following problems.

These days, the method 2) is employed in digital analysis devices that are widely used in conjunction with personal computers, but handling the digital analysis devices requires certain skills in the image positioning operation. Furthermore, the image positioning operation is time-consuming, requiring several hours for each operation.

As for the method 1), there are mechanical or electronic analog devices that employ the method 1) for the image positioning operations. However, these analog devices are expensive, and using one of those devices is also troublesome, as all digital images need to be converted into analog data prior to each operation.

Also, states of vegetation have been examined through visible ray images and near-infrared images in recent years. However, areas that do not show any vegetation are displayed in a single color in the prior art. As a result, there is a further problem that images that show vegetation states are difficult to see clearly.

SUMMARY OF THE INVENTION

It is therefore an object of the present invention to provide a registration correction method that is applicable to image processing, and a vegetation state display method utilizing the registration correction method in which the above disadvantage is eliminated.

A more specific object of the present invention is to provide a registration correction method that is applicable to image processing, by which excellent correcting operations can be performed to correct positional deviations among images with greatly different behaviors such as visible ray images and invisible ray images.

Another specific object of the present invention is to provide a vegetation state display method utilizing the above registration correction method, by which areas that do not show any vegetation are displayed in black and white so that the other areas showing vegetation can be clearly displayed.

The above objects of the present invention are achieved by a registration correction method applicable to image processing for matching a visible ray image formed in a visible ray band area with an invisible ray image formed in an invisible ray band area. This method includes the steps of:

designating one of the visible ray image and the invisible ray image as a reference image, and the other as an object image;

setting a plurality of reference points at different spots within the reference image;

setting a reference window enclosing each of the reference points;

determining differential values of brightness in the x-axis and y-axis directions of each pixel in each reference window;

setting an object point in the object image and an object window enclosing the object point, the object window being of the same size as each reference window;

determining differential values of brightness in the x-axis and y-axis directions of each pixel in the object window, while shifting the object window by the pixel within the object image;

obtaining the total of the squares or the absolute values of the differences between the differential values of each corresponding pixels of the reference window and the object window;

designating the object point where the total becomes smallest as the point corresponding to the reference point of each reference window; and matching the visible ray image with the invisible ray image, with a plurality of the designated points being reference points for the matching.

By this registration correction method, a deviation correcting operation can be easily performed, because the location of one of overlapping images is shifted manually while being checked visually. Alternatively, in an automatic deviation correcting operation, a reference window in a reference image and an object window in the object image are subjected to differentiation, so that the locations of the reference image and the object image can be matched with each other. In this manner, a deviation correcting operation can be accurately performed on images with greatly different behaviors, such as visible ray images and a near-infrared image.

The above objects of the present invention are also achieved by a vegetation state display method that includes the steps of:

matching a red visible ray image formed in a red visible ray band area with a near-infrared image formed in a near-infrared band area by a registration correction method applied to a image processing operation; and displaying an area that has the values $(b_{i,j}-a_{i,j})/(b_{i,j}+a_{i,j})$ as negative values in a monochrome image, with $a_{i,j}$ being the brightness of each pixel in the red visible ray image, and $b_{i,j}$ being the brightness of each corresponding pixel in the near-infrared image.

By this vegetation state display method, an image showing a state of vegetation is displayed in black and white, and can be seen much clearer, compared with an image displaying a state of vegetation in a single color in accordance with prior art.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

The following is a detailed description of embodiments of the present invention, with reference to the accompanying drawings.

First, examples of visible and invisible ray images are defined as follows.

Examples of visible ray images formed in visible ray band areas include a red band image, a green band image, and a blue band image. Examples of invisible ray images formed in invisible ray band areas include a near-infrared image. More specifically, those band areas fall in the following ranges:

1) LANDSAT/MSS

The MSS of LANDSAT is a scanning radiometer that records visible rays (green light and red light) and near-infrared rays in four wavelength bands. The MSS is a sensor that is on board each of LANDSAT No. 1 through LANDSAT No. 5, and takes approximately 180 km×180 km as one picture with a ground resolution of approximately 80 m.

Band 4: 0.5 to 0.6 μm
Band 5: 0.6 to 0.7 μm
Band 6: 0.7 to 0.8 μm
Band 7: 0.8 to 1.1 μm

2) LANDSAT/TM

Like the MSS, the TM of LANDSAT is a scanning radiometer that records various ray areas ranging from visible ray areas to thermal-infrared ray areas in seven wavelength bands. The TM is on board LANDSAT No. 4 and the later ones, and takes approximately 180 km×180 km as one picture with a ground resolution of approximately 30 m (however, the ground resolution for the band 6 is approximately 120 m):

Band 1: 0.45 to 0.52 μm (a blue visible ray area)
Band 2: 0.52 to 0.60 μm (a green visible ray area)
Band 3: 0.63 to 0.69 μm (a red visible ray area)
Band 4: 0.76 to 0.90 μm (a near-infrared ray area)
Band 5: 1.55 to 1.75 μm (an intermediate-infrared ray area)
Band 6: 10.40 to 12.50 μm (a thermal-infrared ray area)
Band 7: 2.08 to 2.53 μm (an intermediate-infrared ray area).

The specifications of the devices used in the embodiments of the present invention are as follows:

[Near-infrared CCD Camera]
Manufacturer: Kodak
Model: Digital Camera DCS4601R
Resolution: 2036×3026 (600 millions)
[Notebook Computer]
Manufacture: IBM
Model: ThinkPad A21P (Type 2629-H2JS/N97-o04A601/01)
OS: Windows2000
Processor: Mobile Pentium III-850 MHz, designed for SpeedStep, 256 KB secondary cache (built in the CPU)
RAM: 256 MB
Hard disc: 32 GB
Display: 15.0-type TFT liquid crystal display (1,600×1,200 dots, 16.77-million colors)

A process of matching visible ray images formed in visible ray band areas with invisible ray images formed in invisible ray band areas is carried out in the following manner.

Step 1: Taking Images of the Object.

Visible-ray images to be taken in visible ray band areas include a red band image, a green band image, and a blue band image. Invisible ray images to be taken in invisible ray band areas include a near-infrared band image.

Step 2: Taking Images into the Computer to Carry Out Format Conversion.

The image data are converted from the TIFF format to the BMP (bitmap) format.

Step 3: Reading Images into a Registration Correction System.

Figure 1:
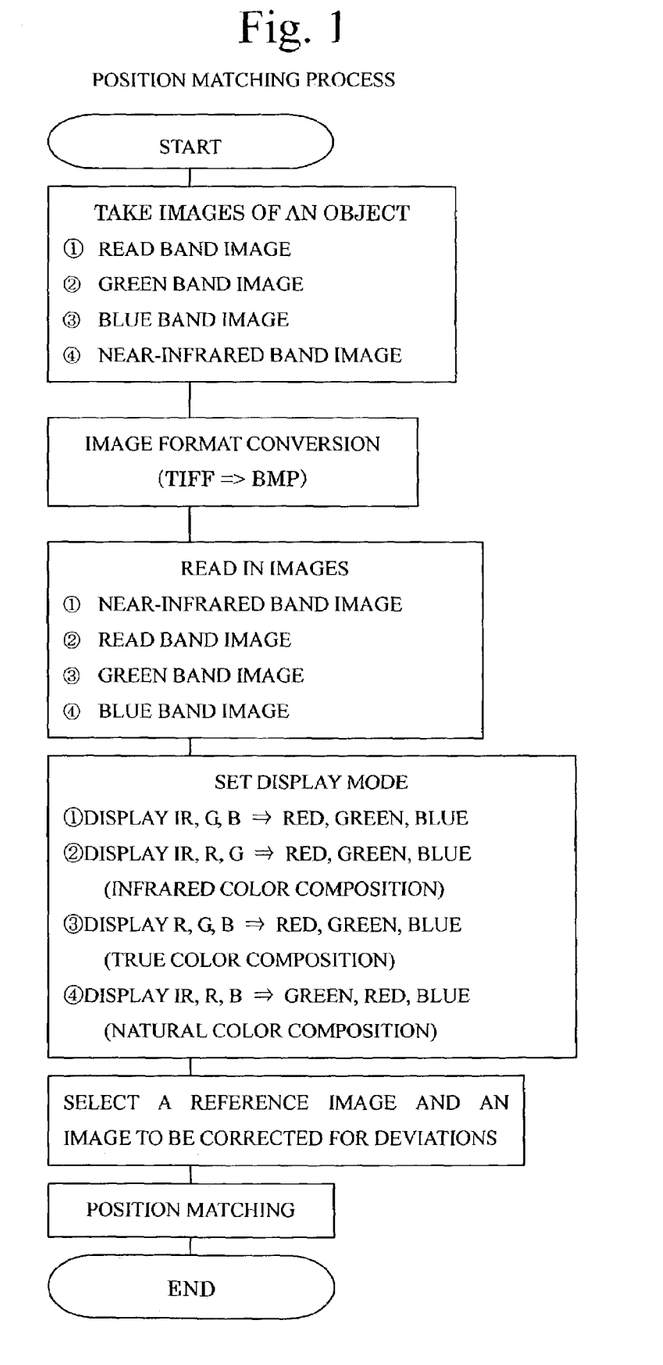
FIG. 1 is a flowchart of a position matching process as an embodiment of the present invention.
Figure 2:
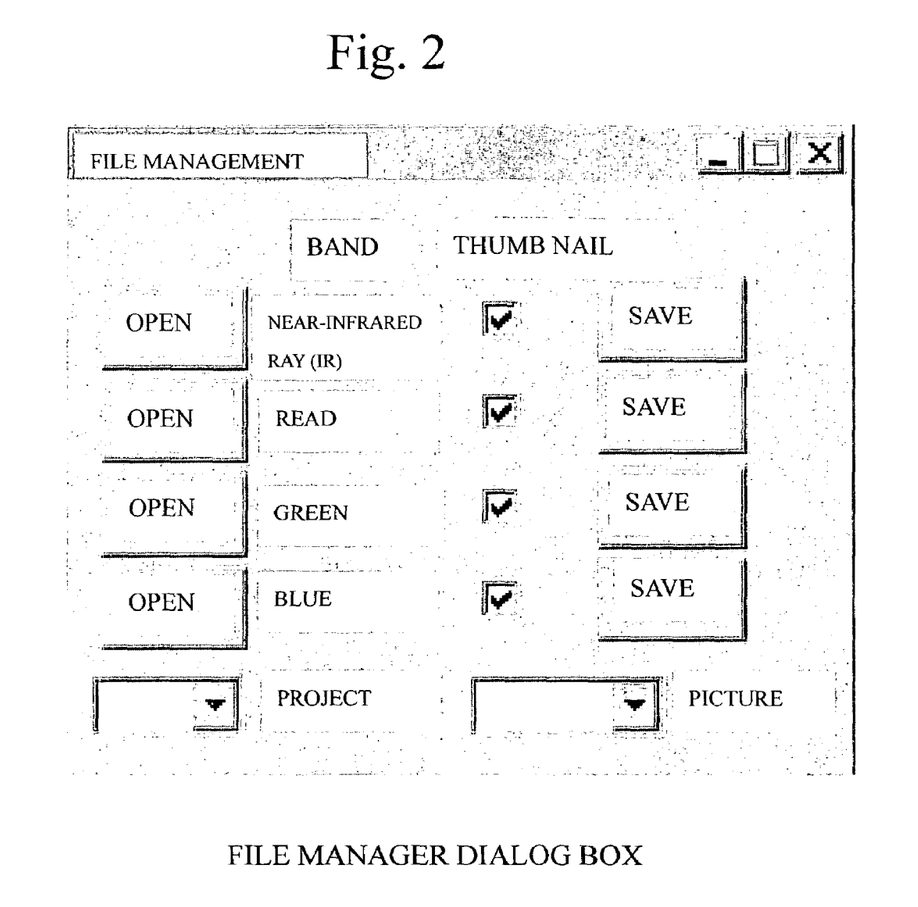
FIG. 2 shows a file manager dialog box in accordance with the embodiment of the present invention.

The open button corresponding to each band should be clicked. See FIG. 2. Images are displayed in an overlapping state.

Figure 3:
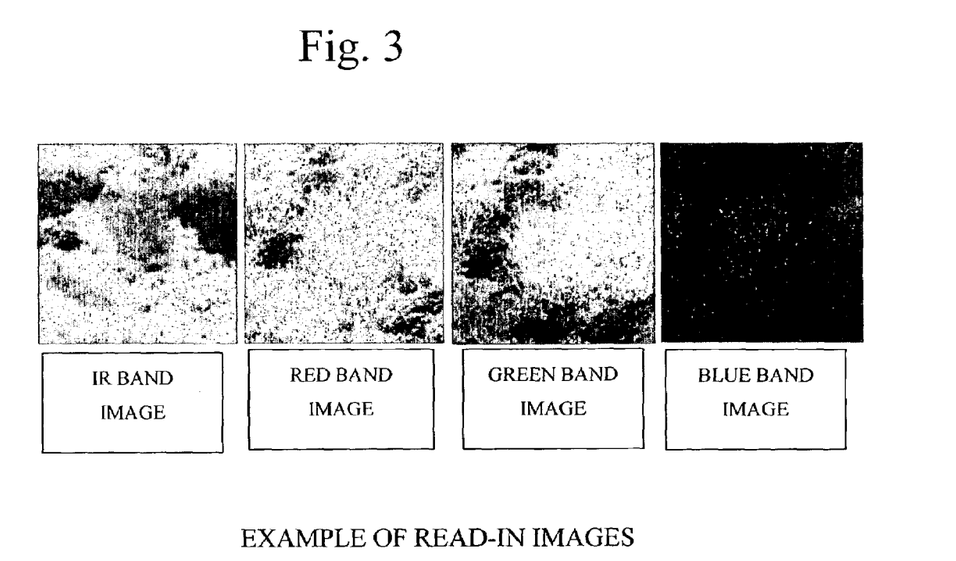
FIG. 3 is an example of read-in images in accordance with the embodiment of the present invention.
Figure 4:
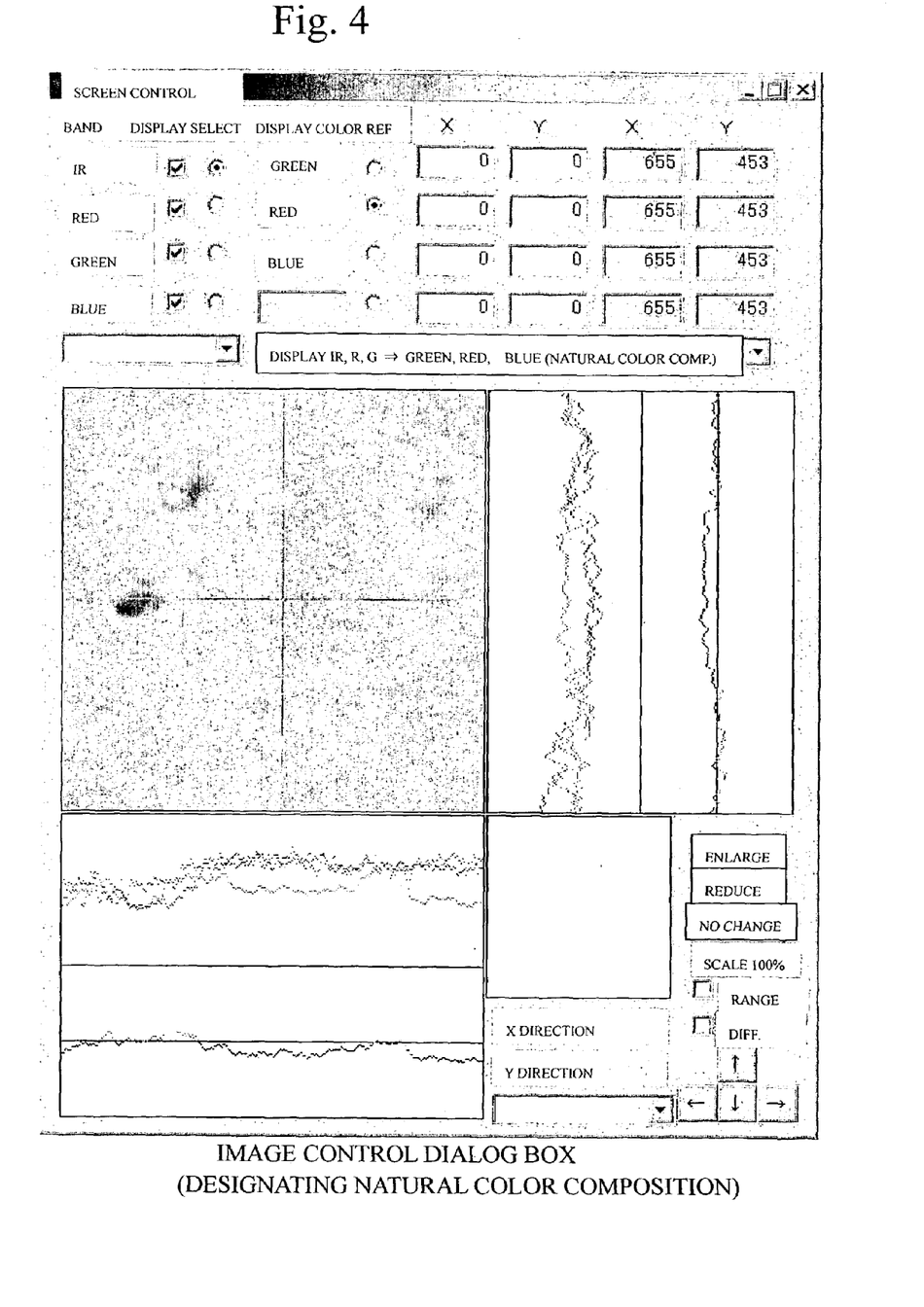
FIG. 4 shows an image control dialog box in accordance with the embodiment of the present invention.
Figure 5:
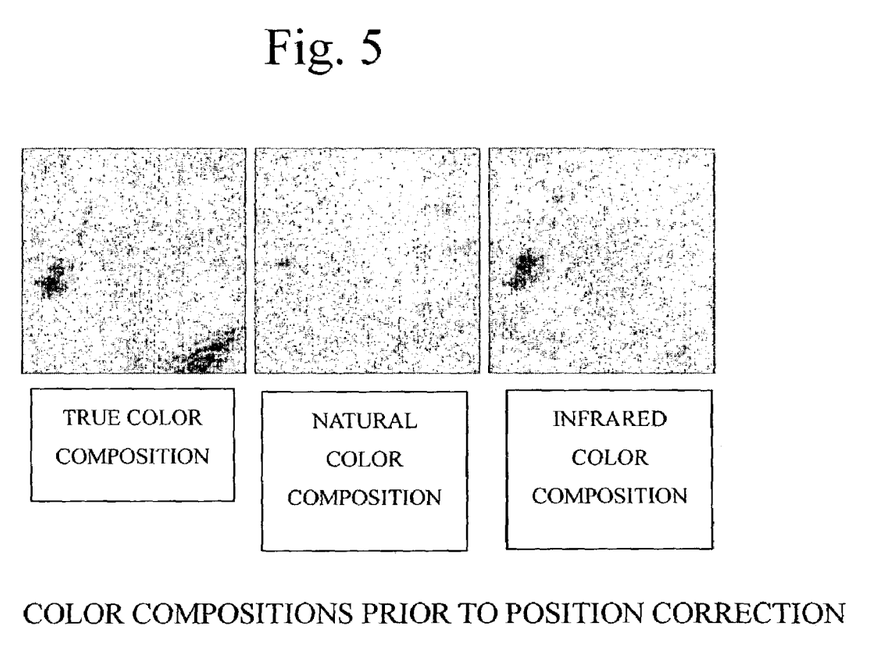
FIG. 5 shows color compositions prior to a position correcting operation in accordance with the embodiment of the present invention.

Four images, i.e., the visible ray images of a red band image, a green band image, and a blue band image, and the invisible ray image of a near-infrared band image, are read in. An example of those read images is shown in FIG. 3.

Step 4: Setting a Display Mode.

The inputted image of each band is divided into primary colors of red, green, and blue.
1) Display IR, G, and B=>red, green, and blue
2) Display IR, R, and G=>red, green, and blue (Infrared Color Composition)
3) Display R, G, and B=>red, green, and blue (True Color Composition)
4) Display IR, R, and G=>green, red, and blue (Natural Color Composition)

Step 5: Selecting a Reference Image and an Image to be Corrected for Deviations.

As a reference image, the red band image of the visible ray images is selected, for example. Also, as an image to be corrected for deviations, the near-infrared band image of the invisible ray image is selected, for example.

Step 6: Performing a Position Matching Operation, i.e., Perform a Registration Correcting Operation.

There are two fashions of position matching operations: one is a manual operation and the other is an automatic operation. If a deviation is as large as 30 pixels or more, the images are roughly positioned by hand in advance, and are then automatically positioned to the correct locations.

1) To Perform an Position Matching Operation by Hand

Check the positions of the images visually, while moving the images by hand. When the arrow on the display is clicked, the designated image moves by the pixel. (If the arrow is clicked while a shift key is held in a pressed position, the designated image will move by 5 pixels.)

2) To Perform an Automatic Position Matching Operation

The pointer of the mouse is moved to the point where the location matching is to be performed. The mouse button is clicked while a control key is held in a pressed position.

Figure 6:
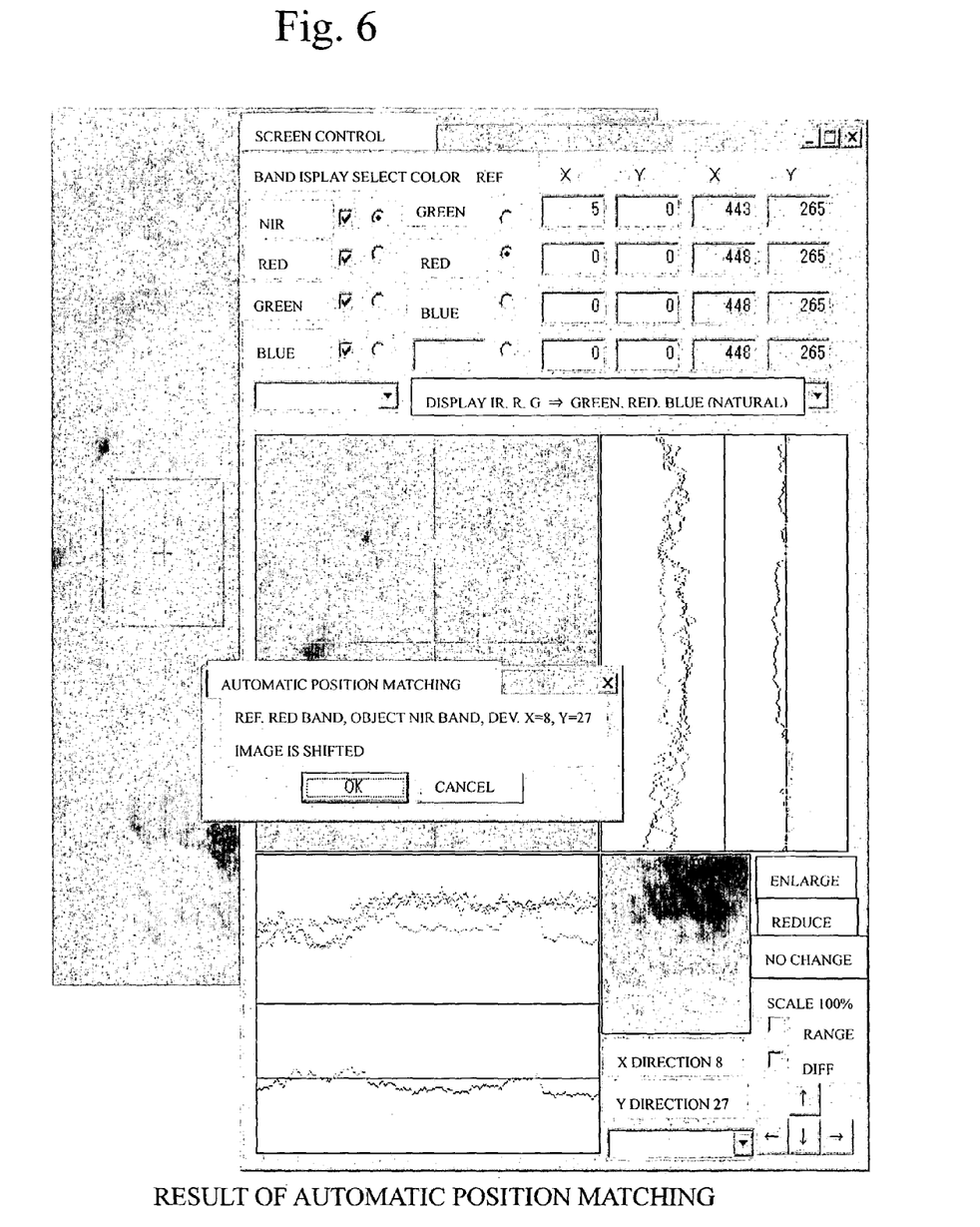
FIG. 6 shows the result of an automatic position matching operation in accordance with the embodiment of the present invention.

FIG. 6 is a screen display that shows the result of a calculation of a deviation of the near-infrared band image with respect to the red band image as the reference image. According to the display, the deviation is 8 pixels in the X-axis direction and 27 pixels in the Y-axis direction (X=8, Y=27). A square window at the right-hand side bottom corner serves as an indicator to indicate a calculation result. The higher the matching degree of the calculation result, the more black the square window.

As methods of matching the positions among images, the SSDA (Sequential Similarity Detection Algorithm) technique, the characteristic-point matching technique, and the edge matching technique, are widely known. If any of the methods is applied to a matching operation among bands, deviations among visible ray band images (R, G, and B) can be accurately detected. In this case, however, a deviation between the near-infrared band image and the visible ray images cannot be accurately detected in an image that contains many objects other than plants (such as artificial objects, soil, and trees without leaves). This is because the brightness in the visible ray band images varies with the actual shade and shadow, while the brightness in the near-infrared image varies with the existence of a plant as well as the actual shade and shadow.

If the SSDA is applied to differential images, i.e., correction method of the present invention, preferable results can be obtained from a position matching operation among bands of visible ray images and an invisible ray image such as a near-infrared image.

Figure 7:
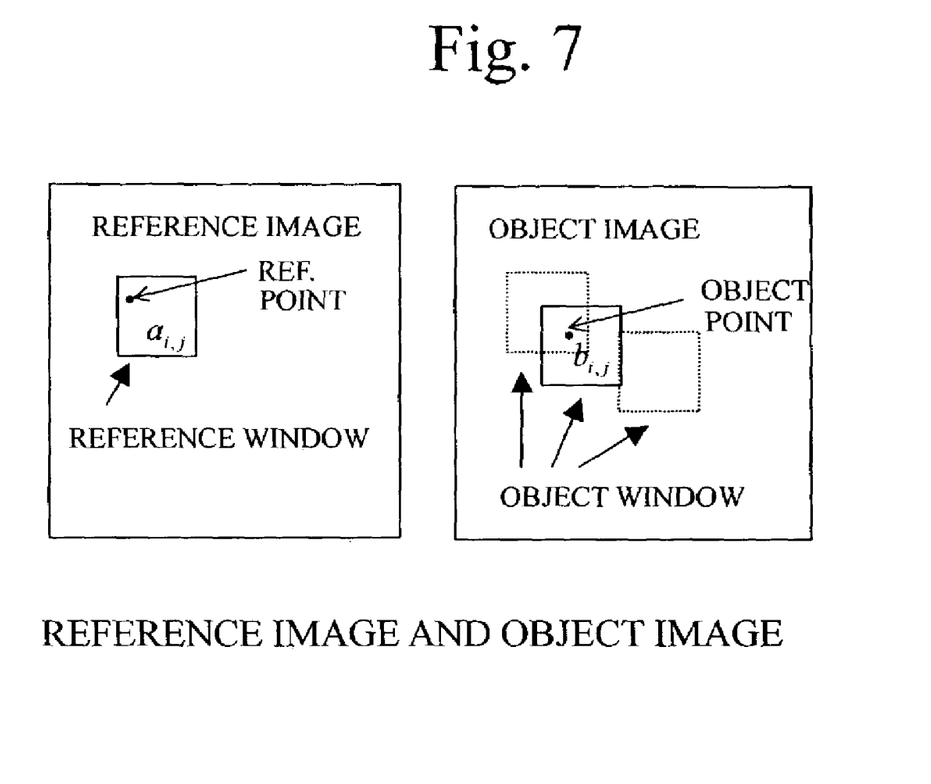
FIG. 7 illustrates a reference image and an image to be corrected in accordance with the embodiment of the present invention.

As shown in FIG. 7, a plurality of reference points are set at different spots in a visible ray image as a reference image, with an invisible ray image such as a near-infrared image being an object image. The reference points can be set at 6 different spots, for example. Each of the reference points is then enclosed in a square-shaped reference window consisting of n×m pixels. Here, each of the reference points is located within the reference window, but may not be located at the center of the reference window.

If the abscissa direction of each of the n×m square-shaped reference windows is set as the x-axis and the ordinate direction as the y-axis, there are n pixels arranged in the x-axis direction of each reference window, and m rows of n pixels arranged in the y-axis direction, with the x-axis direction being the reference direction. On the other and, if the y-axis direction is taken as the reference direction, there are m pixels in the y-axis direction of each reference window, and n rows of m pixels arranged in the x-axis direction.

When the differential values of the brightness in the x-axis and y-axis directions of all the pixels in a reference window are determined, the line formed by connecting the brightness values of the pixels appears to be a polygonal line rather than a curved line in a close view, and seems unable to be subjected to differentiation. However, this line appears to be a curved line in a distant view, and therefore the variation rate of the brightness of each neighboring pixels is determined and referred to as the differential value. The brightness of each pixel is preset within each reference window.

To calculate a differential value in the x-axis direction, the brightness value of a pixel is subtracted from the brightness value of a neighboring pixel on the right-hand side to obtain the value $(a_{i,j} - a_{i-1,j})$, which is the differential value $(\Delta_i a_{i,j})$ of the pixel on the right-hand side. Likewise, to calculate a differential value in the y-axis direction, the brightness value of a pixel is subtracted from the brightness value of a neighboring pixel above the pixel to obtain the value $(a_{i,j} - a_{i,j-1})$, which is the differential value $(\Delta_j a_{i,j})$ of the upper pixel.

In an object image, there is an object point and an object window enclosing the object point. The object window is of the same size as a reference window, i.e., a square-shaped frame containing n×m pixels. The object point is located within the object window. Also, the location of the object point is exactly the same as the location of the reference point of each reference window of the same size. The object point may not be located at the center of the object window, as the reference point may not be located at the center of the reference window.

The differential values of the brightness in the x-axis and y-axis directions of each pixel in the object window are determined while the object window is shifted by the pixel. Like the case of each reference window described above, the line formed by connecting the brightness values of the pixels appears to be a polygonal line rather than a curved line in a close view, and seems unable to be subjected to differentiation. However, this line appears to be a curved line in a distant view, and therefore the variation rate of the brightness of each neighboring pixels is determined and referred to as the differential value. The brightness of each pixel is preset within the object window.

The calculation method of the differential values in the x-axis direction in the object window is exactly the same as the calculation method in the case of each reference window described above. More specifically, the brightness value of a pixel is subtracted from the brightness value of a neighboring pixel on the right-hand side to obtain the value $(b_{i,j} - b_{i-1,j})$, which is the differential value $(\Delta_i b_{i,j})$ of the pixel on the right-hand side. Likewise, to calculate a differential value in the y-axis direction, the brightness value of a pixel is subtracted from the brightness value of a neighboring pixel above the pixel to obtain the value $(b_{i,j}-b_{i,j-1})$, which is the differential value $(\Delta_i b_{i,j})$ of the upper pixel.

As shown in FIG. 7, a reference window of n×m pixels is set in the reference image, and the point corresponding to the center of the reference window is searched for in the object image. To detect a deviation, the object window of n×m pixels is moved in the object image, and the point where the evaluation function becomes smallest is determined.

The total of the squares or the absolute values of the differences between the differential values of the reference window and the object window of all corresponding pixels is then obtained. The formula to determine the total of the squares of differential value differences is expressed as follows:

$$l = \sum_{j=1}^{m} \sum_{i=1}^{n} \left\{ \left(\underset{i}{\Delta} a_{i,j} - \underset{i}{\Delta} b_{i,j}\right)^2 + \left(\underset{j}{\Delta} a_{i,j} - \underset{j}{\Delta} b_{i,j}\right)^2 \right\}$$

$$\underset{i}{\Delta} a_{i,j} = a_{i,j} - a_{i-1,j}$$

$$\underset{j}{\Delta} a_{i,j} = a_{i,j} - a_{i,j-1}$$

$$\underset{i}{\Delta} b_{i,j} = b_{i,j} - b_{i-1,j}$$

$$\underset{j}{\Delta} b_{i,j} = b_{i,j} - b_{i,j} - 1$$

$a_{i,j}$: data of the reference image (preset within the window)

$b_{i,j}$: data of the object image (preset within the window)

n,m: size of the window

The object point where the total becomes smallest in the object window is thus determined. The determined object point of the object window is set as the point corresponding to the reference point of the reference window. These procedures are carried out for each of the reference points of the reference windows in the above described manner, and the object point of each object window is determined.

In this manner, the object points in the respective object windows are determined with respect to the reference points in the respective reference windows. After a correcting operation such as image enlargement or reduction by the affine transformation, for example, is performed, the visible ray images and the invisible ray image are matched with one another, with the determined object points being reference points for the position matching.

Step 7: End

Figure 8:
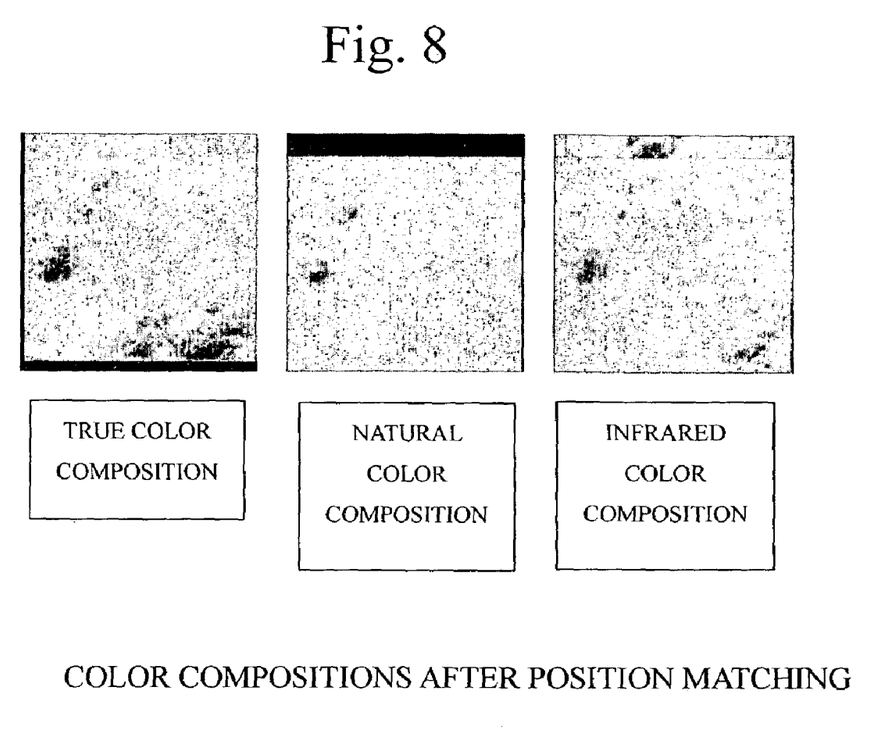
FIG. 8 shows color compositions after the position matching operation in accordance with the embodiment of the present invention.

The compositions after the position matching operation are shown in FIG. 8.

As an example of an application of the registration correction method for image processing, a method of displaying a state of vegetation can be taken. To display a state of vegetation, a red visible ray image formed in a red visible ray band area is placed over a near-infrared image formed in a near-infrared band area.

The red visible ray image formed in the red visible ray band area is matched with the near-infrared ray image formed in the near-infrared band area by the image-processing registration correction method. Also, the area having the values of $(b_{i,j}-a_{i,j})/(b_{i,j}+a_{i,j})$ as negative values is shown as a visible-ray monochrome image in FIG. 9, with the brightness of the red visible ray image being $a_{i,j}$, and the brightness of the near-infrared image being $b_{i,j}$.

Figure 9:
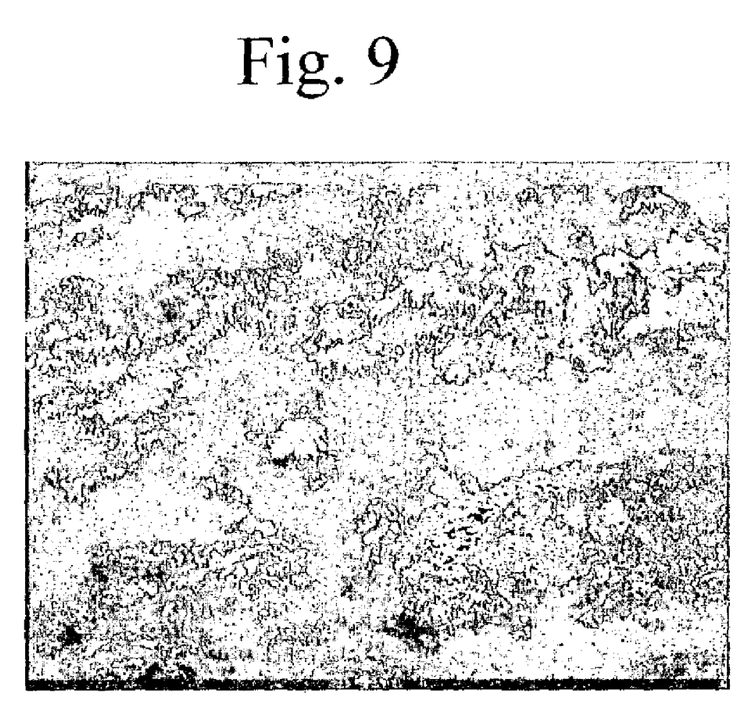
FIG. 9 shows a visible ray monochrome image (a color composition) that displays a non-vegetation part in accordance with the embodiment of the present invention.
Figure 10:
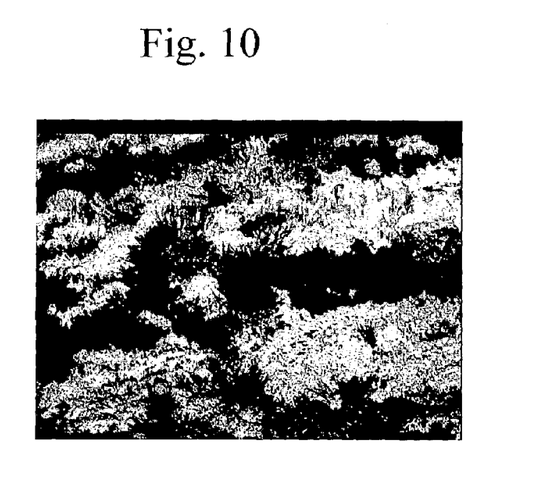
FIG. 10 shows an image (a color composition) that displays a non-vegetation part in accordance with the prior art.

FIG. 10 shows an example of a display in accordance with the prior art. In this image, the negative area is displayed in a single color, and therefore the image showing a state of vegetation is very hard to recognize visually. On the other hand, the image shown in FIG. 9 is displayed as a visible-ray monochrome image. Thus, the image showing the state of vegetation, which is difficult to see in FIG. 10, can be clearly recognized visually in FIG. 9.

[Experiment]

Figure 11:
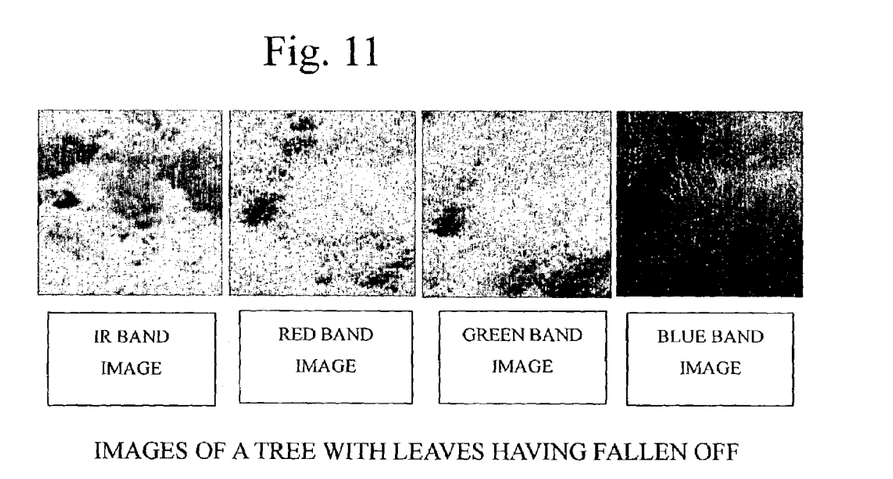
FIG. 11 shows images of a tree with the leaves having fallen off, as an experiment in accordance with the present invention.

FIG. 11 shows images of a tree with the leaves having fallen off. These images were taken in a mountain facing the Mizunashigawa River in Shimabara, Nagasaki, Japan, in mid December. There were evergreen trees around the tree, and the near-infrared state varied greatly. The branches of the tree can be clearly recognized in the visible ray band images, but those branches are blurred in the near-infrared band image.

Using these images, a deviation of the near-infrared band with respect to the red band image as a reference image was measured.

Figure 12:
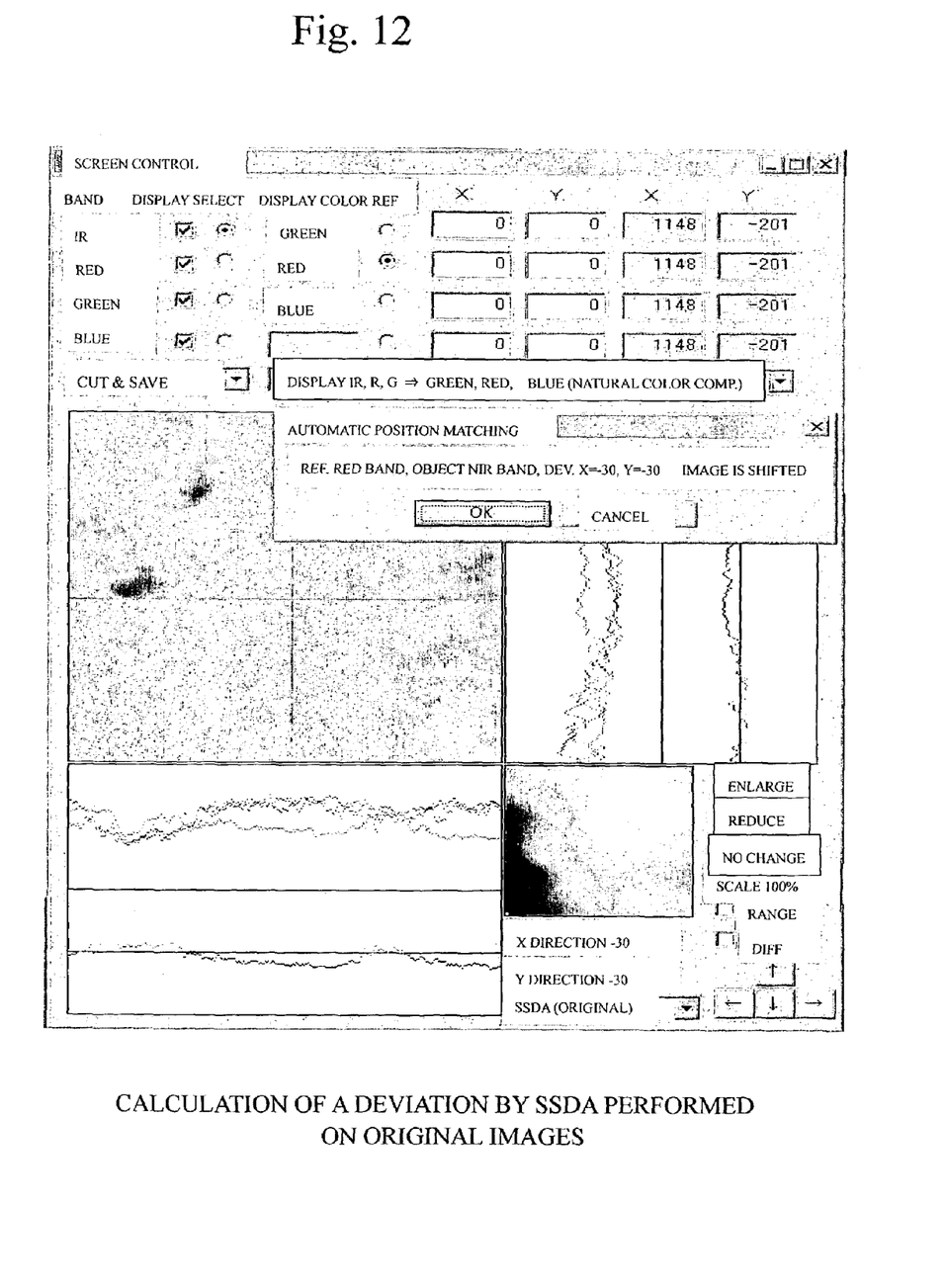
FIG. 12 shows the results of a deviation calculation by the SSDA performed on original images as an experiment in accordance with the present invention.

When the SSDA was performed without differentiation on the original images, an accurate deviation could not be measured, with the large variation of the near-infrared ray being a hindrance to the measurement (see FIG. 12).

Through a calculation, a result of X being −30 and Y being −30 was obtained (the correct value of X is 3, and the correct value of Y is 27). Judging from the indicator window at the right-hand side bottom corner, the calculation result is not correct.

Figure 13:
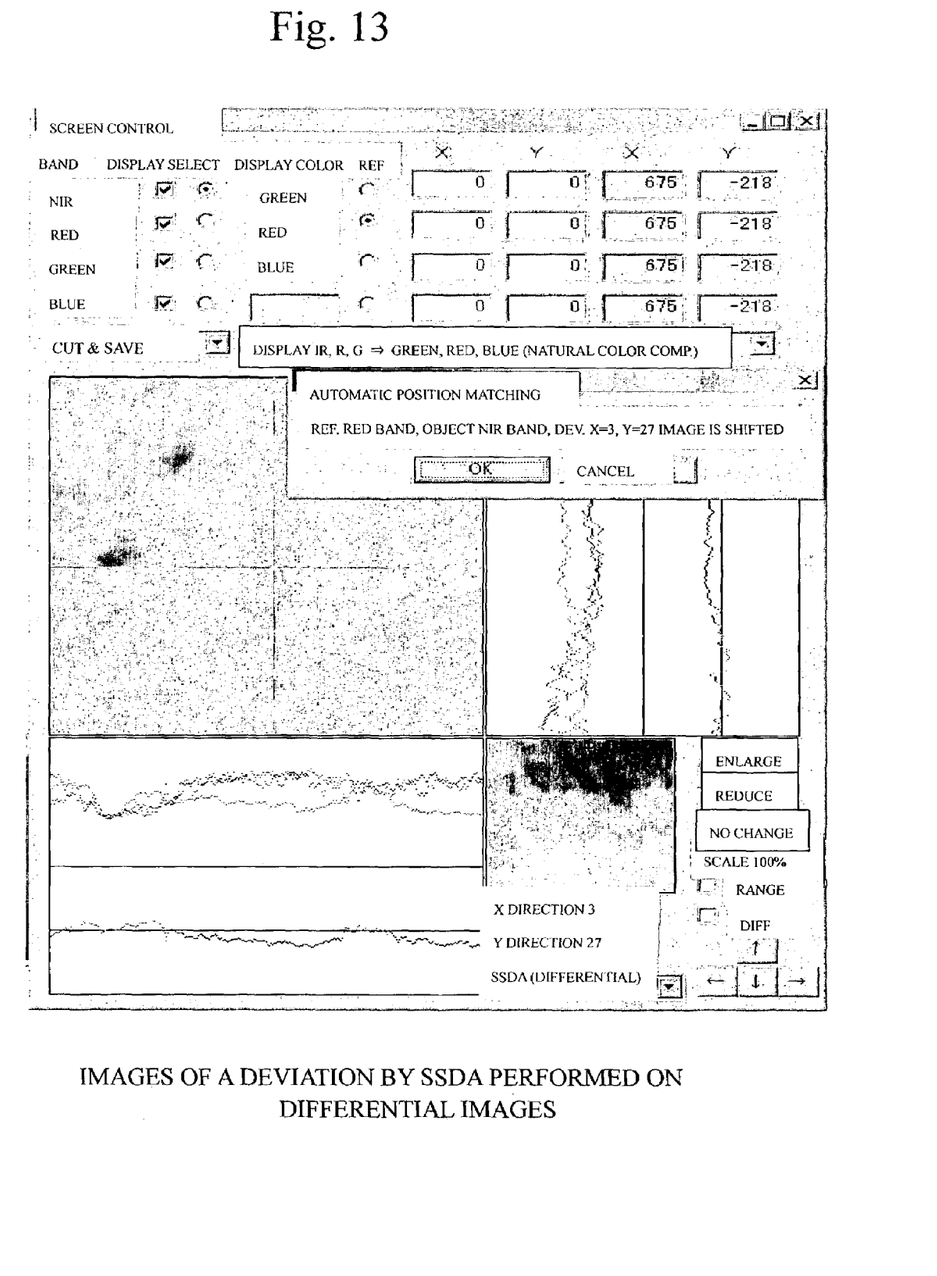
FIG. 13 shows the result of a deviation calculation by the SSDA performed on differential images as an experiment in accordance with the present invention.

FIG. 13 shows the result of a calculation in which the SSDA was applied to images that had been subjected to differentiation. The result shown in FIG. 13 indicates that X is 3 and Y is 27, which are the correct values of X and Y. The indicator window at the right-hand side bottom corner is black at the top right, showing the result is convincible.

Figure 14:
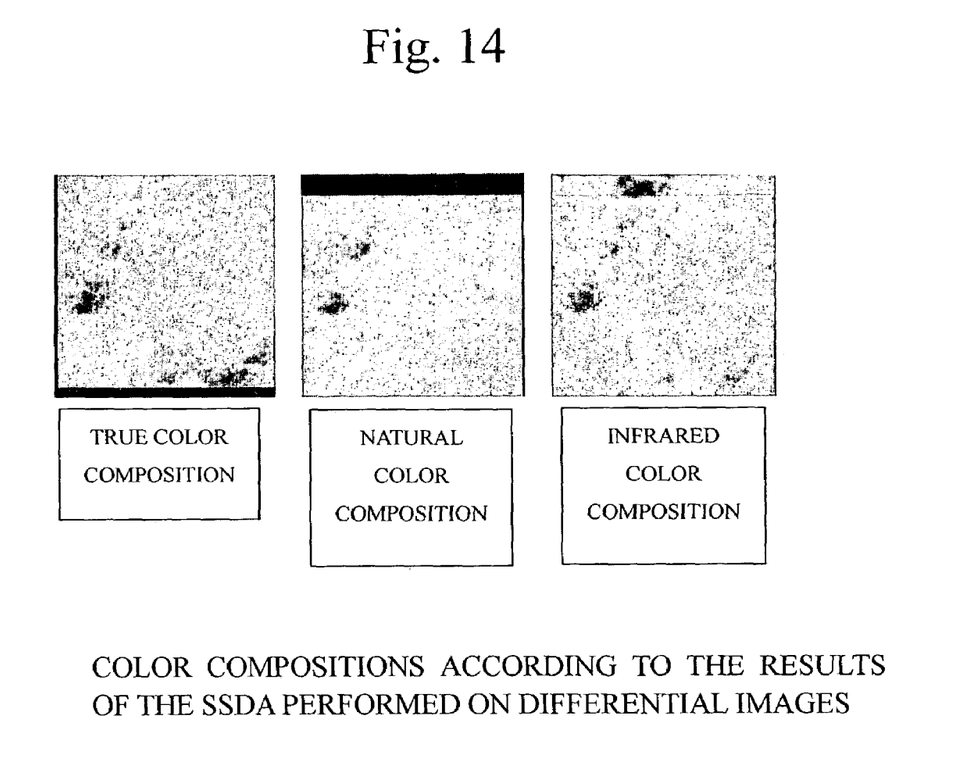
FIG. 14 shows color compositions as a result of the SSDA performed on differential images as an experiment in accordance with the present invention.

Lastly, FIG. 14 shows composition images that have been corrected for a deviation of each band by the differential SSDA, with the red band image being the reference image.

Although a few preferred embodiments of the present invention have been shorn and described, it would be appreciated by those skilled in the art that changes may be made in these embodiments without departing from the principles and spirit of the invention, the scope of which is defined in the claims and their equivalents.

What is claimed is:

1. A registration correction method applicable to image processing for matching a visible ray image formed in a visible ray band area with an invisible ray image formed in an invisible ray band area, the method comprising the steps of:

designating one of the visible ray image and the invisible ray image as a reference image, and the other as an object image;

setting a plurality of reference points at different spots within the reference image;

setting a reference window enclosing each of the reference points;

determining differential values of brightness in the x-axis and y-axis directions of each pixel in each reference window;

setting an object point in the object image and an object window enclosing the object point, the object window being of the same size as each reference window;

determining differential values of brightness in the x-axis and y-axis directions of each pixel in the object window, while shifting the object window by the pixel within the object image;

obtaining the total of the squares or the absolute values of the differences between the differential values of each corresponding pixels of the reference window and the object window;

designating the object point where the total becomes smallest as the point corresponding to the reference point of each reference window; and matching the visible ray image with the invisible ray image, with a plurality of the designated points being reference points for the matching.

2. The registration correction method as claimed in claim 1, wherein the invisible ray image is a near-infrared image.

* * * * *